United States Patent [19]
Morgan et al.

[11] Patent Number: 5,834,416
[45] Date of Patent: Nov. 10, 1998

[54] AZEOTROPES OF ALKYL ESTERS AND HEXAMETHYLDISILOXANE

[75] Inventors: David Lee Morgan; Dwight Edward Williams, both of Midland, Mich.

[73] Assignee: Dow Corning Corporation, Midland, Mich.

[21] Appl. No.: 914,534

[22] Filed: Aug. 19, 1997

[51] Int. Cl.[6] .............................. C11D 7/50; C11D 7/26; B01D 12/00
[52] U.S. Cl. ........................ 510/411; 134/42; 510/177; 510/408; 510/466; 510/505
[58] Field of Search ................... 510/411, 408, 510/466, 505, 177; 134/42

[56] References Cited

U.S. PATENT DOCUMENTS

| | | | |
|---|---|---|---|
| 3,085,065 | 4/1963 | Kvalnes | 252/67 |
| 4,155,865 | 5/1979 | Ostrozynski | 252/67 |
| 4,157,976 | 6/1979 | Ostrozynski | 252/67 |
| 4,994,202 | 2/1991 | Merchant | 252/172 |
| 5,064,560 | 11/1991 | Merchant | 252/171 |
| 5,454,970 | 10/1995 | Flaningam | 252/174 |
| 5,454,972 | 10/1995 | Williams | 252/174 |
| 5,456,856 | 10/1995 | Flaningam | 252/174 |
| 5,478,493 | 12/1995 | Flaningam | 252/174 |
| 5,492,647 | 2/1996 | Flaningam | 252/174 |
| 5,501,811 | 3/1996 | Flaningam | 252/174 |
| 5,507,878 | 4/1996 | Flaningam | 134/42 |
| 5,516,450 | 5/1996 | Williams | 252/174 |
| 5,628,833 | 5/1997 | McCormack | 134/26 |

FOREIGN PATENT DOCUMENTS

| | | |
|---|---|---|
| 0576687 | 1/1994 | European Pat. Off. . |
| 0787537 | 8/1997 | European Pat. Off. . |
| 96/12571 | 5/1996 | WIPO . |

*Primary Examiner*—Christine Skane
*Attorney, Agent, or Firm*—James L. DeCesare

[57] ABSTRACT

Binary azeotrope and azeotrope-like compositions contain the alkyl esters n-propyl acetate (NPA) and sec-butyl acetate (SBA) respectively, with hexamethyldisiloxane (MM), and are useful for cleaning, rinsing, or drying.

4 Claims, No Drawings

AZEOTROPES OF ALKYL ESTERS AND HEXAMETHYLDISILOXANE

BACKGROUND OF THE INVENTION

This invention is directed to solvents for cleaning, rinsing, and drying, which are binary azeotropes or azeotrope-like compositions, containing a volatile methyl siloxane (VMS).

Azeotropes containing an organosilicon compound as one component are described in numerous patents and patent application(s) assigned to the Dow Corning Corporation, Midland, Mich. USA, the same assignee as the present invention.

For example, U.S. Pat. No. 5,454,970 (Oct. 3, 1995) describes azeotropes of octamethyltrisiloxane (MDM) and 2-methyl-1-pentanol, 1-hexanol, 1-butoxy-2-propanol, and ethyl lactate. U.S. Pat. No. 5,454,972 (Oct. 3, 1995) and U.S. Pat. No. 5,516,450 (May 14, 1996) describe azeotropes of MDM and n-propoxypropanol. U.S. Pat. No. 5,456,856 (Oct. 10, 1995) describes azeotrope and azeotrope-like compositions of MDM and 2-butoxyethanol, 2-methylcyclohexanol, and isopropyl lactate. U.S. Pat. No. 5,478,493 (Dec. 26, 1995) describes azeotropes of hexamethyldisiloxane (MM) and 3-methyl-3-pentanol, 2-pentanol, and 1-methoxy-2-propanol. U.S. Pat. No. 5,492,647 (Feb. 20, 1996) describes azeotrope and azeotrope-like compositions of octamethylcyclotetrasiloxane ($D_4$) and lactate, 1-propoxy-2-propanol, 1-butoxy-2-propanol, 1 -butoxy-2-ethanol, and 4-methylcyclohexanol. U.S. Pat. No. 5,501,811 (Mar. 26, 1996) and U.S. Pat. No. 5,507,878 (Apr. 16, 1996) describe azeotrope and azeotrope-like compositions of MDM and 1-heptanol, cyclohexanol, and 4-methylcyclohexanol. U.S. Pat. No. 5,628,833 (May 13, 1997) describes methods of cleaning or dewatering wherein azeotrope and azeotrope-like compositions containing an organosilicon component are used as a rinse agent. A prior copending U.S. application Ser. No. 08/791,041, filed Jan. 28, 1997, describes azeotrope and azeotrope-like compositions of decamethyltetrasiloxane (MDDM) and 1-butoxy-2-propanol, 1-(2-methoxy-1-methylethoxy)-2-propanol, 1-(2-ethoxy-1-methylethoxy)-2-propanol, 1-(2-propoxy-1-methylethoxy)-2-propanol, and 1-(2-methoxy-1-methylethoxy)-2-propanol-acetate.

However, none of these Dow Corning Corporation patents or pending application(s) are directed to azeotropes or azeotrope-like compositions in which the organosilicon component is hexamethyldisiloxane and the organic component is an alkyl ester.

BRIEF SUMMARY OF THE INVENTION

Our invention relates to new binary azeotrope and azeotrope-like compositions containing a volatile methyl siloxane and an alkyl ester. The azeotrope and azeotrope-like compositions have utility as environmentally friendly cleaning, rinsing, and drying agents.

As cleaning agents, the compositions can be used to remove contaminants from any surface, but are especially useful in defluxing and precision cleaning, low-pressure vapor degreasing, and vapor phase cleaning. They exhibit unexpected advantages in their enhanced solvency power, and their maintenance of a constant solvency power following evaporation, which can occur during applications involving vapor phase cleaning, distillation, regeneration, and wipe cleaning.

Because the cleaning agent is an azeotrope or an azeotrope-like composition, it has another advantage in that it can be easily recovered and recirculated. Thus, the composition can be separated as a single substance from a contaminated cleaning bath after its use in the cleaning process. By simple distillation, its regeneration is facilitated, so that it can be freshly recirculated.

In addition, these compositions possess an enhanced solvency power compared to the volatile methyl siloxane itself. Yet, the compositions still exhibit a mild solvency power, making them useful for cleaning delicate surfaces without harm.

These and other features of our invention will become apparent from a consideration of the detailed description.

DETAILED DESCRIPTION OF THE INVENTION

An azeotrope is a mixture of two or more liquids, the composition of which does not change upon distillation. Thus, a mixture of 95 percent ethanol and 5 percent water boils at a lower temperature (78.15° C.) than pure ethanol (78.3° C.) or pure water (100° C.). Such liquid mixtures behave like a single substance in that the vapor produced by partial evaporation of liquid has the same composition as the liquid. Thus, the mixtures distill at a constant temperature without change in composition, and cannot be separated by normal distillation.

Azeotropes can exist in systems containing two liquids as binary azeotropes, three liquids as ternary azeotropes, and four liquids as quaternary azeotropes. However, azeotropism is an unpredictable phenomenon, with the result that each azeotrope or azeotrope-like composition must be discovered. The unpredictable nature of azeotrope formation is well documented in U.S. Pat. Nos. 3,085,065, 4,155,865, 4,157,976, 4,994,202, or 5,064,560. As documented, it is known that one of ordinary skill in the art cannot predict or expect azeotrope formation, even among constitutional isomers such as butyl, isobutyl, sec-butyl, and tert-butyl.

For purposes of our invention, a mixture of two or more components is azeotropic if it vaporizes with no change in the composition of the vapor from the liquid. Specifically, azeotropes include mixtures that boil without changing composition, and mixtures that evaporate at a temperature below their boiling point without changing composition. Accordingly, an azeotropic composition may include mixtures of two components over a range of proportions where each specific proportion of the two components is azeotropic at a certain temperature but not necessarily at other temperatures.

Azeotropes vaporize with no change in composition. If the applied pressure is above the vapor pressure of the azeotrope, it evaporates without change. If the applied pressure is below the vapor pressure of the azeotrope, it boils or distills without change. The vapor pressure of a low boiling azeotrope is higher, and the boiling point is lower, than its individual components. In fact, the azeotropic composition has the lowest boiling point of any composition of its components. Thus, an azeotrope can be obtained by distillation of a mixture whose composition initially departs from that of the azeotrope.

Since only certain combinations of components form azeotropes, the formation of an azeotrope cannot be found without experimental vapor-liquid-equilibria data, that is vapor and liquid compositions at constant total pressure or temperature, for various mixtures of the components. The composition of some azeotropes is invariant to temperature, but in many cases, the azeotropic composition shifts with temperature. As a function of temperature, the azeotropic composition can be determined from high quality vapor-liquid-equilibria data at a given temperature. Commercial software such as ASPENPLUS®, a program of Aspen Technology, Inc., Cambridge, Mass., is available to assist one in conducting the statistical analysis necessary to make such determinations. Given a set of experimental data, programs such as ASPENPLUS® can calculate parameters from which complete tables of composition and vapor pressure are generated. This allows one to determine where a true azeotropic composition is located.

The art also recognizes the existence of azeotrope-like compositions. For purposes of our invention, azeotrope-like means a composition that behaves like an azeotrope. Thus, azeotrope-like compositions have constant boiling characteristics, or have a tendency not to fractionate upon boiling or evaporation. In an azeotrope-like mixture, the composition of the vapor formed during boiling or evaporation is identical or substantially identical to the composition of the original liquid. During boiling or evaporation, the liquid changes only minimally, or to a negligible extent, if it changes at all. In other words, it has about the same composition in vapor phase as in liquid phase when employed at reflux. In contrast, the liquid composition of non-azeotrope-like mixtures changes to a substantial degree during boiling or evaporation. By definition, an azeotrope-like composition includes all ratios of the azeotropic components that boil within one °C. of the minimum boiling point at 760 Torr.

The VMS component of our azeotrope and azeotrope-like composition is hexamethyldisiloxane $(CH_3)_3SiOSi(CH_3)_3$. It has a viscosity of 0.65 $mm^2s$ (centistokes) at 25° C., and is often referred to in the literature as "MM" since it contains two monofunctional "M" units $(CH_3)_3SiO_{1/2}$.

The other component of our azeotrope and azeotrope-like compositions are the commercially available alkyl esters n-propyl acetate $CH_3CO_2CH_2CH_2CH_3$ and sec-butyl acetate $CH_3CO_2CH(CH_3)C_2H_5$.

The boiling points of the three liquids in °C. measured at standard barometric pressure (760 Torr) are 100.52° for MM, 101.5° for n-propyl acetate (NPA), and 111.8° for sec-butyl acetate (SBA).

New binary azeotropes were discovered containing 60 to 84 percent by weight MM and 16 to 40 percent by weight n-propyl acetate; and 93 to 96 percent by weight MM and 4 to 7 percent by weight sec-butyl acetate.

These compositions were homogeneous and had a single liquid phase at the azeotropic temperature and at room temperature. Homogeneous azeotropes are more desirable than heterogeneous azeotropes especially for cleaning, because homogeneous azeotropes exist as one liquid phase instead of two. In contrast, each phase of a heterogeneous azeotrope differs in cleaning power. Therefore, cleaning performance of a heterogeneous azeotrope is difficult to reproduce, because it depends on consistent mixing of the phases. Single phase (homogeneous) azeotropes are also more useful than multi-phase (heterogeneous) azeotropes since they can be transferred between locations with facility.

Each homogeneous azeotrope we discovered existed over a particular temperature range. Within that range, the azeotropic composition shifted with temperature. The following example illustrates our invention in more detail.

EXAMPLE I

We used a single-plate distillation apparatus for measuring vapor-liquid-equilibria. The liquid mixture was boiled and the vapor condensed in a small receiver. The receiver had an overflow path for recirculation to the boiling liquid. When equilibrium was established, samples of boiling liquid and condensed vapor were separately removed, and quantitatively analyzed by gas chromatography. The temperature, ambient pressure, and liquid-vapor compositions were measured at several different initial composition points. This data was used to determine if an azeotrope or azeotrope-like composition existed. The composition at different temperatures was determined using our data in an ASPENPLUS® software program which performed a statistical analysis of the data.

Our new azeotropes are shown in Tables I and II. In the Tables, WEIGHT % MM is weight percent hexamethyldisiloxane in the azeotrope. VP is vapor pressure expressed in Torr units, i.e., 1 Torr≈0.133 kPa≈1 mm Hg. Accuracy in determining these compositions was±two weight percent.

TABLE I

| ALKYL ESTER | TEMPERATURE °C. | VP (Torr) | WEIGHT % MM |
|---|---|---|---|
| n-propyl acetate | 106.00 | 1000.0 | 60 |
| | 96.73 | 760.0 | 61 |
| | 75.00 | 371.8 | 65 |
| | 50.00 | 141.2 | 70 |
| | 25.00 | 44.0 | 76 |
| | 0.00 | 10.6 | 84 |

TABLE II

| ALKYL ESTER | TEMPERATURE °C. | VP (Torr) | WEIGHT % MM |
|---|---|---|---|
| sec-butyl acetate | 110.10 | 1000 | 93 |
| | 100.47 | 760 | 96 |

The Tables show that at different temperatures, the composition of a given azeotrope varies. Thus, an azeotrope represents a variable composition which depends on temperature.

We also discovered azeotrope-like compositions containing MM and n-propyl acetate, and MM and sec-butyl acetate.

Thus, azeotrope-like compositions of MM and n-propyl acetate were found at 760 Torr vapor pressure for all ratios of the components, where the weight percent of n-propyl acetate varied between 15 to 68 percent and the weight percent MM varied between 32 to 85 percent. These azeotrope-like compositions had a normal boiling point (the boiling point at 760 Torr) that was within one °C. of 96.73° C., which is the normal boiling point of the azeotrope itself.

Similarly, azeotrope-like compositions of MM and sec-butyl acetate were found at 760 Torr vapor pressure for all ratios of the components, where the weight percent of sec-butyl acetate varied between 4 to 30 percent and the weight percent MM varied between 70 to 96 percent. These azeotrope-like compositions had a normal boiling point (the boiling point at 760 Torr) that was within one °C. of 100.47° C., which is the normal boiling point of the azeotrope itself.

These azeotrope-like compositions are shown in Table III.

TABLE III

AZEOTROPE-LIKE

| ALKYL ESTER | TEMP °C. | VP Torr | WEIGHT % MM | WEIGHT % ESTER |
|---|---|---|---|---|
| n-propyl acetate | 96.73–97.73 | 760 | 32–85 | 15–68 |
| sec-butyl acetate | 100.47–101.47 | 760 | 70–96 | 4–30 |

The procedure for determining the azeotrope-like compositions was the same as Example I. The azeotrope-like compositions were homogeneous and have the same utility as the azeotropes.

An especially useful application of our azeotrope and azeotrope-like composition is cleaning and removing fluxes used in mounting electronic parts on printed circuit boards, where solder is used in making mechanical, electromechanical, or electronic connections. In making electronic connections, components are attached to conductor paths of printed wiring assemblies by wave, reflow, or manual soldering. The solder is usually a tin-lead alloy used with a rosin-based flux. Fluxes containing rosin, a complex mixture of isomeric acids principally abietic acid, often contain activators such as amine hydrohalides and organic acids. The flux (i) reacts with and removes surface compounds such as oxides, (ii) reduces the surface tension of the molten solder alloy, and (iii) prevents oxidation during the heating cycle by providing a surface blanket to the base metal and solder alloy.

After soldering, it is usually necessary to clean the assembly, and the compositions of our invention are useful as the cleaner. They remove corrosive flux residues formed on areas unprotected by the flux during soldering, or residues which could cause malfunctioning and short circuiting of electronic assemblies. In this application, our compositions can be used as cold cleaners, vapor degreasers, or ultrasonically. The compositions can also be used to remove carbonaceous materials from the surface of these and other industrial articles. By carbonaceous herein is meant any carbon containing compound or mixture of carbon containing compounds soluble in common organic solvents such as hexane, toluene, or trichloroethane.

We selected six azeotrope or azeotrope-like compositions for cleaning a rosin-based solder flux soil. Cleaning tests were conducted at 22° C. in an open bath with no distillation recycle of the composition. The compositions contained 16 percent n-propyl acetate, 24 percent n-propyl acetate, 39 percent n-propyl acetate, 68 percent n-propyl acetate, 4 percent sec-butyl acetate, and 30 percent sec-butyl acetate; the remainder to 100 percent being MM. They all removed flux although not all were equally effective. The following example further illustrates our invention.

EXAMPLE II

We used an activated rosin-based solder flux commonly used for electrical and electronic assemblies. It was KESTER 1544, a product of Kester Solder Division-Litton Industries, Des Plaines, Ill. Its approximate composition is 50 percent by weight modified rosin, 25 percent by weight ethanol, 25 percent by weight 2-butanol, and 1 percent by weight proprietary activator. The rosin flux was mixed with 0.05 percent by weight of non-reactive low viscosity silicone glycol flow-out additive. A uniform thin layer of the mixture was applied to a 2"x3" (5.1x7.6 cm) area of an aluminum panel and spread out evenly with the edge of a spatula. The coating was allowed to dry at room temperature (20°–25° C.) and cured at 100° C. for 10 minutes in an air oven. The panel was placed in a large magnetically stirred beaker filled one-third with azeotrope. Cleaning was conducted with rapid stirring at room temperature even when cleaning with higher temperature azeotropes. The panel was removed at timed intervals, dried at room temperature, weighed, and re-immersed for additional cleaning. The initial coating weight and weight loss were measured as functions of cumulative cleaning time as shown in Table IV.

In Table IV, NPA is n-propyl acetate and SBA is sec-butyl acetate. WT % is weight percent of alkyl ester. TEMP is azeotropic temperature in °C. WT is initial weight of coating in grams. Time is cumulative time after 1, 5, 10, and 30 minute intervals. Composition 7, a CONTROL of 100 percent by weight hexamethyldisiloxane, was used for comparison. Table IV shows that our azeotrope and azeotrope-like compositions 1–6 were more effective cleaners than CONTROL 7, and that CONTROL 7 removed flux much more slowly than any of our azeotrope or azeotrope-like compositions.

TABLE IV

CLEANING EXTENT AT ROOM TEMPERATURE (22° C.)

| | | | | WT | % REMOVED (Time/min) | | | |
|---|---|---|---|---|---|---|---|---|
| No | WT % | LIQUIDS | TEMP | (gm) | 1 | 5 | 10 | 30 |
| 1 | 39 | NPA | 96.73 | 0.3535 | 99.5 | 99.6 | 99.6 | 99.7 |
| 2 | 24 | NPA | 25.00 | 0.3687 | 34.7 | 97.3 | 98.4 | 98.5 |
| 3 | 16 | NPA | 0.00 | 0.3596 | 0.9 | 3.6 | 27.0 | 70.3 |
| 4 | 68 | NPA | 97.73 | 0.3445 | 99.8 | 99.9 | 99.9 | 100.0 |
| 5 | 4 | SBA | 100.47 | 0.3359 | 6.5 | 11.7 | 18.0 | 37.2 |
| 6 | 30 | SBA | 101.47 | 0.3420 | 76.1 | 93.0 | 93.2 | 93.2 |
| 7 | NONE | MM | — | 0.3560 | 0.8 | 3.6 | 6.1 | 11.4 |

Our azeotrope and azeotrope-like compositions have several vantages for cleaning, rinsing, or drying. They can be generated by distillation so performance of the cleaning mixture is restored after periods of use. Other performance factors beneficially affected by the compositions are bath life, cleaning speed, lack of flammability when one component is nonflammable, and lack of damage to sensitive parts.

In vapor phase degreasing, the compositions can be restored by continuous distillation at atmospheric or reduced pressure, and continually recycled. In such applications, cleaning or rinsing can be conducted at the boiling point by plunging the part into the boiling liquid, or allowing the refluxing vapor to condense on a cold part. Alternatively, the part can be immersed in a cooler bath continually fed with fresh condensate, while dirty overflow liquid is returned to a sump. In the latter case, the part is cleaned in a continually renewed liquid with maximum cleaning power.

When used in open systems, composition and performance remain constant even though evaporative losses occur. Such systems can be operated at room temperature as ambient cleaning baths or wipe-on-by-hand cleaners. Cleaning baths can also be operated at elevated temperatures but below the boiling point; since cleaning, rinsing, or drying, often occur faster at elevated temperature, and are desirable when parts being cleaned and equipment permit.

In manual cleaning operations, our azeotrope and azeotrope-like compositions may be applied by directing an aerosol spray on the article to be cleaned, or directing the aerosol spray upon a fibrous or porous scrub brush or pad.

Our compositions are beneficial when used to rinse water displacement fluids from (i) mechanical and electrical parts such as gear boxes or electric motors, and (ii) other articles made of metal, ceramic, glass, and plastic, such as electronic and semiconductor parts; precision parts such as ball bearings; optical parts such as lenses, photographic, or camera parts; and military or space hardware such as precision guidance equipment used in the defense and aerospace industries. Our compositions are effective as rinsing fluid, even though most water displacement fluids contain small amounts of one or more surfactants, and (i) more thoroughly remove residual surfactant on the part; (ii) reduce carry-over loss of rinse fluid; and (iii) increase the extent of water displacement.

Cleaning can be conducted by using a given azeotrope or azeotrope-like composition at or near its azeotropic temperature or at some other temperature. The composition can be used alone, or combined with small amounts of one or more organic liquid additives capable of enhancing oxidative stability, corrosion inhibition, or solvency.

Oxidative stabilizers in amounts of about 0.05 to 5 percent by weight inhibit slow oxidation of organic compounds such as alcohols. Corrosion inhibitors in amounts of about 0.1 to 5 percent by weight prevent metal corrosion by trace acids that may be present or slowly form in alcohols. Solvency enhancers in amounts of about 1 to 10 percent by weight increase solvency power by adding a more powerful solvent.

These additives can also mitigate undesired effects of other components of azeotrope and azeotrope-like compositions, since they are not as resistant to oxidative degradation as the volatile methyl siloxane. Numerous additives are suitable, as the VMS is miscible with small amounts of many additives. The additive, however, must be one in which the resulting liquid mixture is homogeneous and single phased, and one that does not significantly affect the azeotrope or azeotrope-like character of the composition.

Useful oxidative stabilizers are phenols such as trimethylphenol, cyclohexylphenol, thymol, 2,6-di-t-butyl-4-methylphenol, butylhydroxyanisole, and isoeugenol; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpiperidine, and N,N'-diallyl-p-phenylenediamine; and triazoles such as benzotriazole, 2-(2'-hydroxy-5'-methylphenyl) benzotriazole, and chlorobenzotriazole.

Useful corrosion inhibitors are acetylenic alcohols such as 3-methyl-1-butyn-3-ol and 3-methyl-1-pentyn-3-ol; epoxides such as glycidol, methyl glycidyl ether, allyl glycidyl ether, phenyl glycidyl ether, 1,2-butylene oxide, cyclohexene oxide, and epichlorohydrin; ethers such as dimethoxymethane, 1,2-dimethoxyethane, 1,4-dioxane, and 1,3,5-trioxane; unsaturated hydrocarbons such as hexene, heptene, octene, 2,4,4-trimethyl-1-pentene, pentadiene, octadiene, cyclohexene, and cyclopentene; olefin based alcohols such as allyl alcohol and 1-butene-3-ol; and acrylic acid esters such as methyl acrylate, ethyl acrylate, and butyl acrylate.

Useful solvency enhancers are hydrocarbons such as pentane, isopentane, hexane, isohexane, and heptane; nitroalkanes such as nitromethane, nitroethane, and nitropropane; amines such as diethylamine, triethylamine, isopropylamine, butylamine, and isobutylamine; alcohols such as methanol, ethanol, n-propyl alcohol, isopropyl alcohol, n-butanol, and isobutanol; ethers such as methyl CELLOSOLVE®, tetrahydrofuran, and 1,4-dioxane; and ketones such as acetone, methyl ethyl ketone, and methyl butyl ketone.

Other variations may be made in compounds, compositions, and methods described herein without departing from the essential features of our invention. The forms of our invention are exemplary only and not intended as limitations on their scope as defined in the appended claims.

We claim:

1. A composition consisting essentially of an azeotrope consisting essentially of:

about 60 to 84 percent by weight hexamethyldisiloxane and about 16 to 40 percent by weight n-propyl acetate, wherein the composition is homogenous and azeotropic at a temperature within the range of about 0° to 106° C. inclusive, wherein the composition has a vapor pressure of about 10.6 Torr at 0° C. when the composition consists essentially of 84 percent by weight hexamethyldisiloxane and 16 percent by weight n-propyl acetate, wherein the composition has a vapor pressure of about 1,000 Torr at 106° C. when the composition consists essentially of 60 percent by weight hexamethyldisiloxane and 40 percent by weight n-propyl acetate; and wherein the composition is homogenous and azeotropic at a temperature within one degree of 96.73° C. at 760 Torr.

2. A method of cleaning, rinsing, or drying the surface of an article comprising applying to the surface a composition defined in claim 1.

3. A composition consisting essentially of an azeotrope-like composition consisting essentially of:

about 32 to 85 percent by weight hexamethyldisiloxane and about 15 to 68 percent by weight n-propyl acetate, wherein the composition is homogenous and azeotrope-like at a temperature within one degree of 96.73° C. at 760 Torr.

4. A method of cleaning, rinsing, or drying the surface of an article comprising applying to the surface a composition defined in claim 3.

* * * * *